US012005595B2

(12) United States Patent
Washington

(10) Patent No.: US 12,005,595 B2

(45) Date of Patent: Jun. 11, 2024

(54) RAZOR CARTRIDGE WITH A ROTATABLY ATTACHED HOUSING PORTION

(71) Applicant: The Gillette Company LLC, Boston, MA (US)

(72) Inventor: Jack Anthony Washington, Mendon, MA (US)

(73) Assignee: The Gillette Company LLC, Boston, MA (US)

( * ) Notice: Subject to any disclaimer, the term of this patent is extended or adjusted under 35 U.S.C. 154(b) by 229 days.

(21) Appl. No.: 17/161,856

(22) Filed: Jan. 29, 2021

(65) Prior Publication Data

US 2022/0241995 A1 Aug. 4, 2022

(51) Int. Cl.

*B26B 21/40* (2006.01)
*B26B 21/22* (2006.01)
*B26B 21/44* (2006.01)

(52) U.S. Cl.

CPC ........ *B26B 21/4025* (2013.01); *B26B 21/225* (2013.01); *B26B 21/4012* (2013.01); *B26B 21/4043* (2013.01); *B26B 21/4031* (2013.01); *B26B 21/443* (2013.01)

(58) Field of Classification Search

CPC ....... B26B 21/14; B26B 21/16; B26B 21/225; B26B 21/40; B26B 21/4012; B26B 21/4025; B26B 21/4043; B26B 21/443
USPC .............................................. 30/34.1, 47–51
See application file for complete search history.

(56) References Cited

U.S. PATENT DOCUMENTS 3,909,942 A 10/1975 Ciaffone
4,461,078 A * 7/1984 Carreker ............. B26B 21/4043 30/50
4,715,120 A * 12/1987 McGready .......... B26B 21/4012 30/57
4,791,724 A * 12/1988 Dumas .................... B26B 21/18 30/48
4,860,449 A * 8/1989 Duncan ................. B26B 21/222 30/47
5,199,173 A * 4/1993 Hegemann .............. B26B 21/40 30/51
(Continued)

FOREIGN PATENT DOCUMENTS

WO WO-2009135159 A1 * 11/2009 ........... B26B 21/225
WO 2020016348 A1 1/2020

OTHER PUBLICATIONS

15958 PCT Search Report and Written Opinion for PCT/US2022/013445 dated May 24, 2022, 11 pages.

*Primary Examiner* — Jason Daniel Prone

(74) *Attorney, Agent, or Firm* — John M. Lipchitz

(57) ABSTRACT

A razor cartridge including a first housing portion having a first top surface positioned on a first plane; one or more razor blade members mounted in the first housing portion and each including a blade with a cutting edge; and a second housing portion rotatably attached to the first housing portion. The second housing portion has a second top surface positioned on a second plane, and the second top surface includes an engagement surface configured to receive a shaving razor component. The second housing portion has a first position in which the second plane is positioned at an angle of between negative 30 degrees and 30 degrees with respect to the first plane and a second position in which the second plane is positioned at an angle of between 70 degrees to 130 degrees with respect to the first plane.

2 Claims, 10 Drawing Sheets

(56) References Cited

U.S. PATENT DOCUMENTS

| | | | | |
|---|---|---|---|---|
| 5,222,300 | A * | 6/1993 | Althaus | B26B 21/227 30/47 |
| 5,251,376 | A | 10/1993 | Althaus et al. | |
| 5,542,178 | A * | 8/1996 | Harkleroad | B26B 21/4043 30/47 |
| 6,276,061 | B1 * | 8/2001 | Rozenkranc | B26B 21/4043 30/34.1 |
| 6,434,828 | B1 * | 8/2002 | Andrews | B26B 21/443 30/51 |
| 7,367,125 | B2 * | 5/2008 | Aviza | B26B 21/443 30/50 |
| 7,761,999 | B2 * | 7/2010 | Macove | B26B 21/22 30/34.1 |
| 8,381,406 | B2 * | 2/2013 | Miyazaki | B26B 21/40 30/51 |
| 8,533,959 | B2 * | 9/2013 | Davis | B26B 21/4043 30/50 |
| 8,567,068 | B2 * | 10/2013 | Luxton | B26B 21/4012 30/50 |
| 8,782,903 | B2 * | 7/2014 | Clarke | B26B 21/4043 30/50 |
| 9,193,080 | B2 * | 11/2015 | Whelan | B26B 21/4043 |
| 10,093,031 | B2 * | 10/2018 | Ren | B26B 21/4043 |
| 10,155,321 | B2 * | 12/2018 | Bozikis | B26B 21/4025 |
| 10,307,923 | B2 * | 6/2019 | Psimadas | B26B 21/4025 |
| 10,377,051 | B2 * | 8/2019 | Bozikis | B26B 21/4031 |
| 10,654,184 | B1 * | 5/2020 | Richitelli | B26B 21/4043 |
| 10,773,403 | B2 * | 9/2020 | Washington | B26B 21/225 |
| 10,850,412 | B2 * | 12/2020 | Harris | B26B 21/4012 |
| 10,906,196 | B2 * | 2/2021 | Hahn | B26B 21/44 |
| 11,511,448 | B2 * | 11/2022 | Efthimiadis | B26B 21/4012 |
| D976,488 | S * | 1/2023 | Washington | B26B 21/222 D28/47 |
| 2005/0126007 | A1 | 6/2005 | Aviza | |
| 2007/0283567 | A1 * | 12/2007 | Magli | B26B 21/40 30/34.1 |
| 2016/0318198 | A1 * | 11/2016 | Brazley | B26B 21/4025 |
| 2019/0308336 | A1 * | 10/2019 | Bozikis | B26B 21/4025 |
| 2021/0245380 | A1 * | 8/2021 | Petratou | B26B 21/44 |
| 2021/0252726 | A1 * | 8/2021 | Brette | B26B 21/52 |
| 2022/0241994 | A1 * | 8/2022 | Washington | B26B 21/4012 |
| 2022/0266464 | A1 * | 8/2022 | Seferi | B26B 21/52 |

* cited by examiner

RAZOR CARTRIDGE WITH A ROTATABLY ATTACHED HOUSING PORTION

FIELD OF THE INVENTION

The invention generally relates to shaving razors and more particularly to shaving razor cartridges having a rotatably attached housing portion.

BACKGROUND OF THE INVENTION

In general, a cartridge or blade unit of a safety razor has at least one blade with a cutting edge that is moved across the surface of the skin being shaved by means of a handle to which the cartridge is attached. Some shaving razors are provided with a spring-biased cartridge that pivots relative to the handle to follow the contours of the skin during shaving. The cartridge may be mounted detachably on the handle to enable the cartridge to be replaced by a fresh cartridge when the blade sharpness has diminished to an unsatisfactory level, or it may be attached permanently to the handle, with the intention that the entire razor be discarded when the blade or blades have become dulled. Razor cartridges usually include a guard that contacts the skin in front of the blade(s) and a cap for contacting the skin behind the blade(s) during shaving. The cap and guard may aid in establishing the so-called "shaving geometry," i.e., the parameters that determine a blade orientation and position relative to the skin during shaving, which in turn have a strong influence on the shaving performance and efficacy of the razor. The cap may comprise a water leachable shaving aid to reduce drag and improve comfort. The guard may be generally rigid and may, for example, be formed integrally with a frame or platform structure that provides a support for the blades. Guards may also comprise softer elastomeric materials to improve skin stretching.

During the manufacturing of a typical shaving razor cartridge, blades are mounted within a plastic shaving cartridge housing. After the blades are properly mounted within the cartridge housing, a blade retention member, such as a clip, is mounted over the blade and secured to the cartridge housing. The relative position of the blades (e.g., the shaving plane) is very important, as it is a determining factor in overall shaving performance. The shaving plane of the final assembled shaving cartridge may be impacted by the plastic shaving cartridge housing and/or the assembly process. For example, the injection molding process may create a distorted cartridge housing. Furthermore, the mounting of the blade retention member may distort the blade edges and/or the cartridge housing.

The water leachable shaving aid may comprise one or more lubricating materials that provide lubrication benefits during use. Conventional water leachable shaving aids typically comprise a multi-layer or composite structure, with a skin contacting surface comprising one or more layers of lubricating material and a lower portion comprising a different, harder material, such as a water insoluble polymer, that is generally required to hold the shaving aid in place in the razor cartridge. The lubricating material is generally at least partially water soluble and is softer than the water insoluble polymer. Over multiple uses of the razor cartridge, the layer(s) of lubricating material may erode, leaving only the harder material of the lower portion on the skin contacting surface, which can decrease comfort during shaving.

Conventional razor cartridges also suffer from issues related to retention of shaving razor components such as the shaving aid. The lower portion of the shaving aid typically includes an enlarged end that is received in a slot formed in the razor cartridge, and the skin engaging portion is held in the razor cartridge via a friction fit between the enlarged end and the slot. Thus, the shaving aid may become dislodged during use.

Some razor cartridges include a trimmer blade located on a bottom portion of the razor cartridge that may be used to trim longer hair, such as beards and sideburns. Conventional trimmer blades often must be specially made and comprise a structure that is different from a typical razor blade. In some examples, the trimmer blade may form part of a larger trimmer assembly mounted in the razor cartridge, and in some particular examples, the trimmer assembly may be metal so that the trimmer blade can be fused to the trimmer assembly. The trimmer assembly and specially-made trimmer blade may result in greater cost and may require additional time and/or special equipment to assemble.

Accordingly, there remains a need for a more cost-effective shaving razor cartridge that demonstrates improved lubrication benefits and retention of shaving razor components, along with faster and easier assembly.

SUMMARY OF THE INVENTION

In accordance with an aspect of the present disclosure, a razor cartridge is provided, the razor cartridge including: a first housing portion having a first top surface positioned on a first plane; one or more razor blade members mounted in the first housing portion and each including a blade with a cutting edge; and a second housing portion rotatably attached to the first housing portion. The second housing portion has a second top surface positioned on a second plane, in which the second top surface includes an engagement surface configured to receive a shaving razor component. The second housing portion has a first position in which the second plane is positioned at an angle of between negative 30 degrees and 30 degrees with respect to the first plane and a second position in which the second plane is positioned at an angle of between 70 degrees to 130 degrees with respect to the first plane.

In accordance with another aspect of the present disclosure, a razor cartridge is provided, the razor cartridge including: a first housing portion having a first top surface positioned on a first plane, a first lateral end including a first outer surface having a first post, and a second lateral end including a second outer surface having a second post extending in an opposite direction to the first post; one or more razor blade members mounted in the first housing portion and each including a blade with a cutting edge; and a second housing portion having a second top surface positioned on a second plane, a first lateral end including a first arm, and a second lateral end including a second arm. The first post is connected to the first arm, and the second post is connected to the second arm. The second housing portion has a first position in which the second plane is positioned at an angle of between negative 30 degrees and 30 degrees with respect to the first plane and a second position in which the second plane is positioned at an angle of between 70 degrees and 130 degrees with respect to the first plane, in which the first post and the second post facilitate rotation between the first and second positions.

In accordance with a further aspect of the present disclosure, a razor cartridge is provided, the razor cartridge including: a first housing portion having a first top surface positioned on a first plane; one or more razor blade members mounted in the first housing portion; a second housing portion rotatably attached to the first housing portion, the second housing portion having a second top surface positioned on a second plane; and a first shaving razor component including a trimmer blade member disposed between the first and second housing portions. The second housing portion has a first position in which the second top surface is positioned at an angle of between negative 30 degrees and 30 degrees with respect to the first plane and a second position in which the second plane is positioned at an angle of between 70 degrees and 130 degrees with respect to the first plane. When the second housing portion is in the second position, the second housing portion secures the trimmer blade member against the first housing portion.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1:
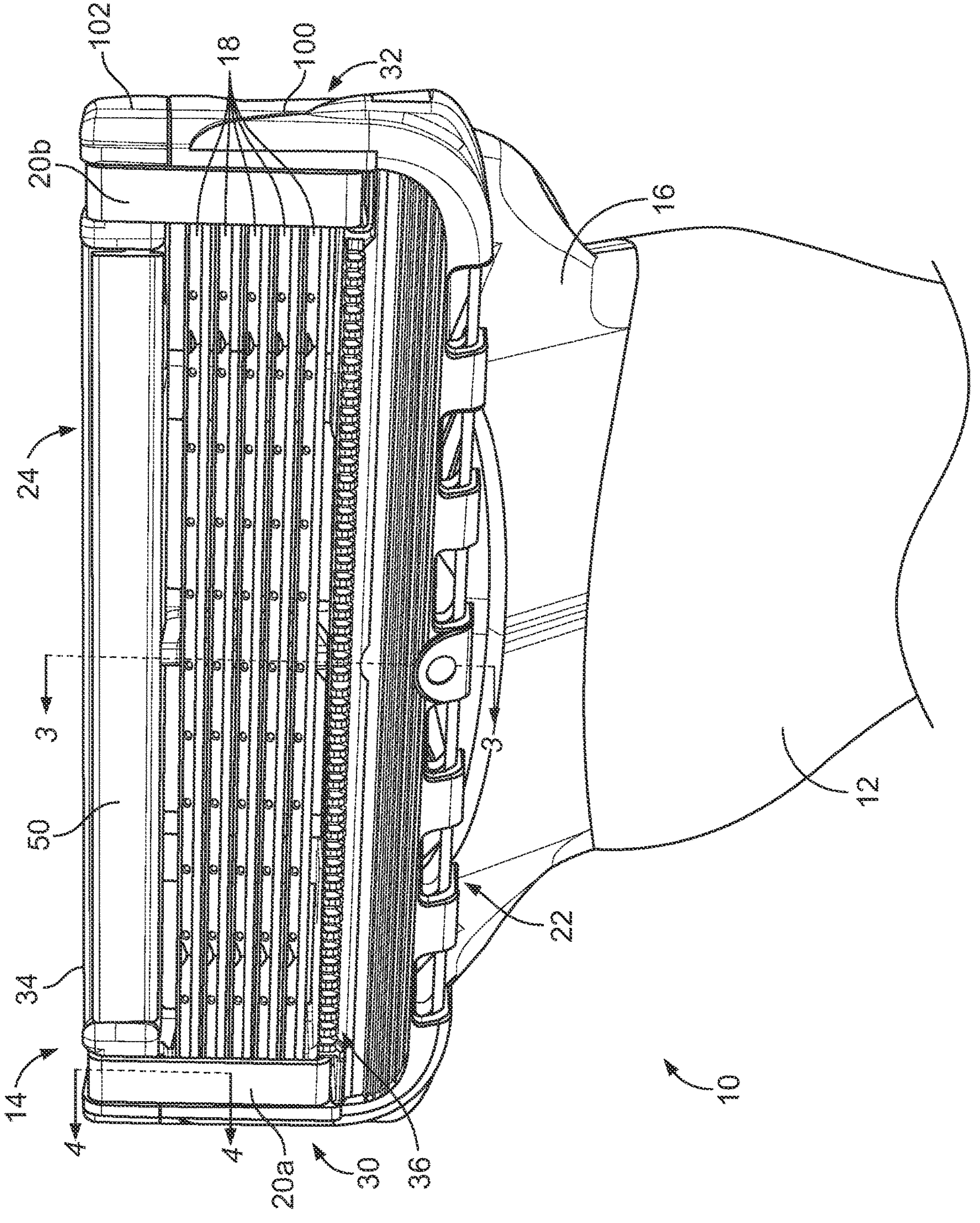
FIG. 1 is a front, perspective view of a razor system comprising a razor cartridge with razor blades and a handle in accordance with an aspect of the present disclosure, in which the razor cartridge is in a closed position.

With reference to FIG. 1, a shaving razor system 10 comprises a handle 12 and a razor cartridge 14. In some examples, the razor cartridge 14 may be detachably mounted to the handle 12 with a connector 16 as shown, and in other examples, the razor cartridge 14 may be attached permanently to the handle 12. The razor cartridge 14 may pivot relative to the handle 12. The razor cartridge 14 may comprise a front portion 22, a back portion 24, a top portion 26, a bottom portion 28 (see FIG. 2), a first end portion 30, and a second end portion 32. As used herein, the terms "front/forward," "back/rear," and derivatives thereof may refer to an orientation or direction with respect to the front and back portions 22 and 24 of the razor cartridge 14, and the terms "top/up," "bottom/down," "vertical," and derivatives thereof may refer to an orientation or direction with respect to the top and bottom portions 26 and 28 of the razor cartridge 14.

The razor cartridge 14 may include one or more razor blade members 18 mounted therein. With reference to a representative one of the razor blade members 18 near the guard structure 36 in FIG. 3, the razor blade member 18 may include an assembly that comprises a blade **18*a* and a blade support member 18*c* coupled to the blade 18*a*. The blade 18*a* may comprise a blade tip 18*b* that defines a cutting edge of the blade 18*a*. In other examples (not shown), the razor blade member 18 may comprise a one-piece structure. The razor blade member 18 may be mounted in the razor cartridge 14 within a blade slot 38 and may be secured to the razor cartridge 14 by first and second clips 20*a* and 20*b* (see FIG. 1), as known in the art. Although five razor blade members 18 are shown, it is understood that any number of razor blade members, more or less, may be mounted within the razor cartridge 14**.

Figure 5:
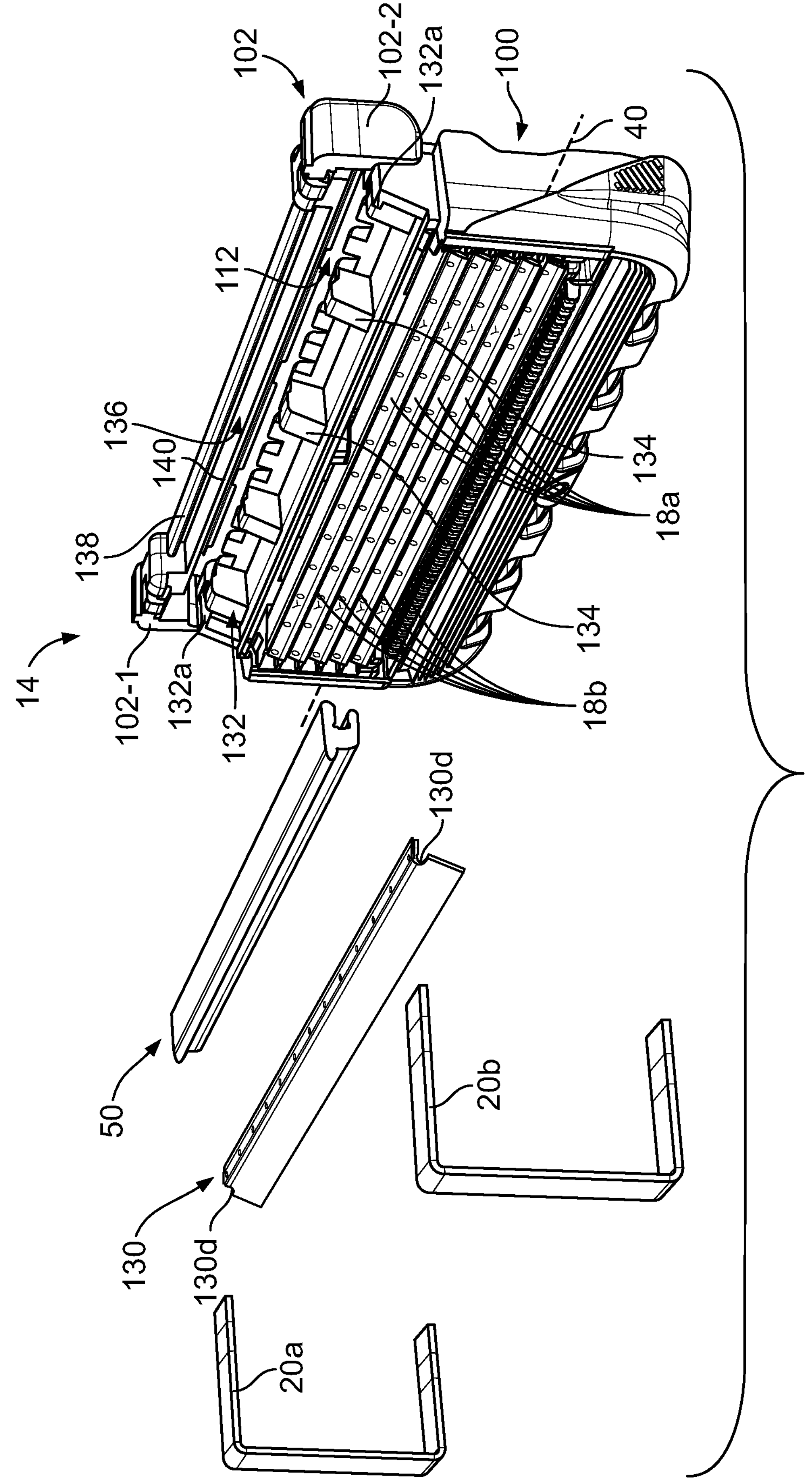
FIG. 5 is an exploded, perspective view of a razor cartridge in accordance with an aspect of the present disclosure, in which the razor cartridge is in an open position.

As shown in FIG. 5, the razor cartridge 14 may comprise a longitudinal axis 40, and the cutting edges of the blades **18*a*, as defined by the blade tips 18*b*, may extend in a longitudinal direction parallel to the longitudinal axis 40 of the razor cartridge 14**.

The razor cartridge 14 may further comprise a cap 34 located near the back portion 24 of the razor cartridge 14 and one or more guard structures 36 located near the front portion 22 of the razor cartridge 14, as shown in FIG. 1. The one or more guard structures 36 may be positioned in front of the razor blade members 18 and may be joined to or integral with the razor cartridge 14. The razor cartridge 14 may comprise one or more shaving razor components, e.g., a skin engaging member 50 and/or trimmer blade member 130, as described herein.

Figure 6:
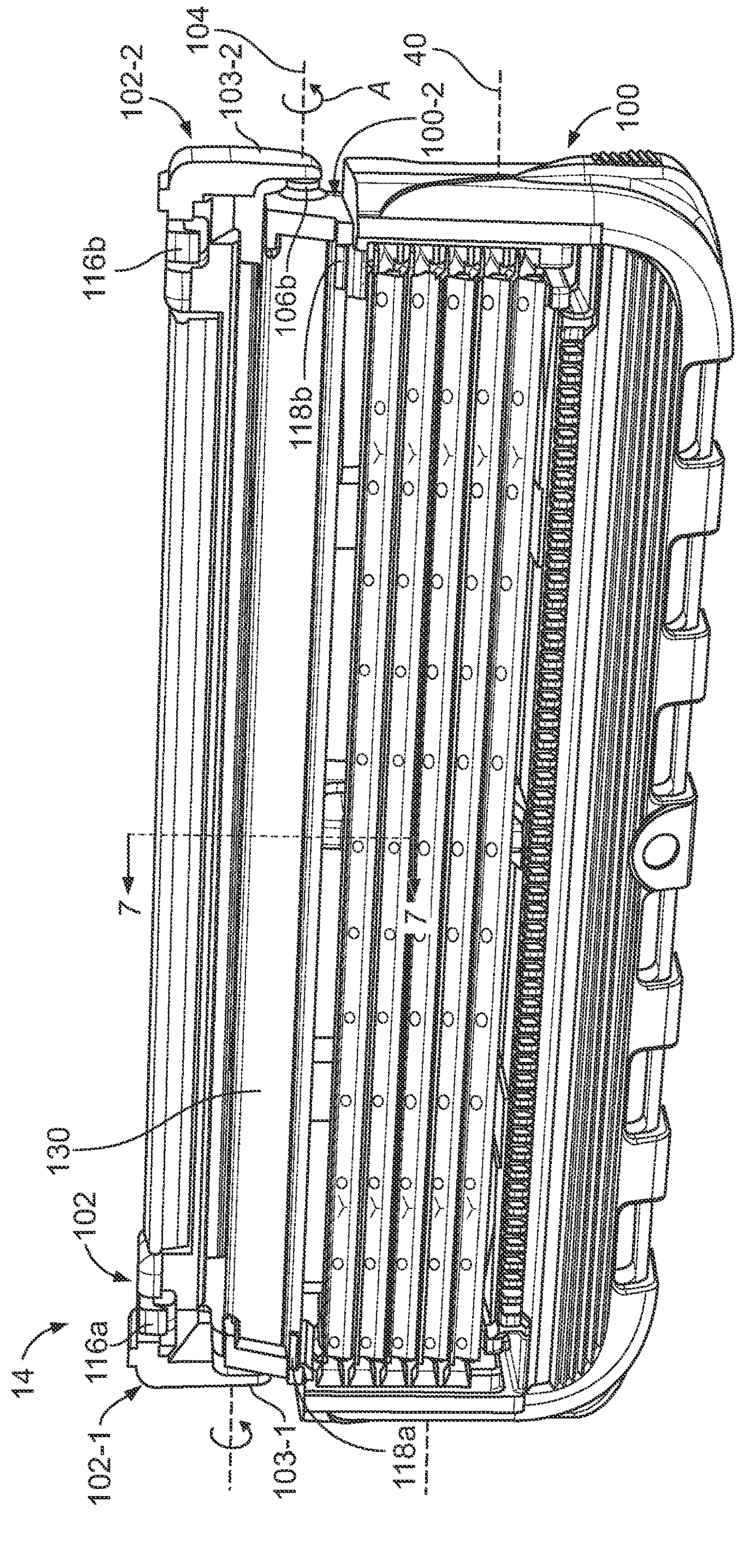
FIG. 6 is a front, perspective view of the razor cartridge of FIG. 5 following installation of a skin engaging member and a trimmer blade.

With reference to FIGS. 1 and 6, the razor cartridge 14 in accordance with the present disclosure comprises a first housing portion 100 and a second housing portion 102. The one or more razor blade members 18 may be mounted in the first housing portion 100 as described herein. The second housing portion 102 may define at least a part of the back portion 24 of the razor cartridge 14. The second housing portion 102 is rotatably attached to the first housing portion 100 such that the second housing portion 102 rotates or pivots relative to the first housing portion 100 from a first, open position (shown in FIG. 6) to a second, closed position (shown in FIG. 1). As shown in FIG. 6, the second housing portion 102 rotates relative to the first housing portion 100 in a direction indicated by arrow A about an axis 104 that is parallel to the cutting edges (as defined by the blade tips **18*b*) of the blades 18*a*, e.g., parallel to the longitudinal axis 40 of the razor cartridge 14 (see also FIG. 7). The second housing portion 102 may be rotatably attached to the first housing portion 100 via one or more hinges 106*a* and 106*b* (only one hinge 106*b* is visible in FIG. 6; see also FIGS. 2 and 8**).

In some examples, the first housing portion 100, the second housing portion 102, and the hinges **106*a* and 106*b* may all comprise a same material and may be integrally formed together (i.e., the first and second housing portions 100 and 102 and the first and second hinges 106*a* and 106*b* may be monolithic). For example, the first and second housing portions 100 and 102 and hinges 106*a* and 106*b* may all comprise a polymeric material, such as Noryl™ (a blend of polyphenylene oxide (PPO) and polystyrene developed by General Electric Plastics, now SABIC Innovative Plastics), acrylonitrile butadiene styrene (ABS), acetal, polypropylene, high impact polystyrene, or any combination (s) thereof. The first and second housing portions 100 and 102 and the hinges 106***a* and 106*b* may be formed by injection molding, additive manufacturing, or other known manufacturing processes or combination(s) thereof.

Figure 8:
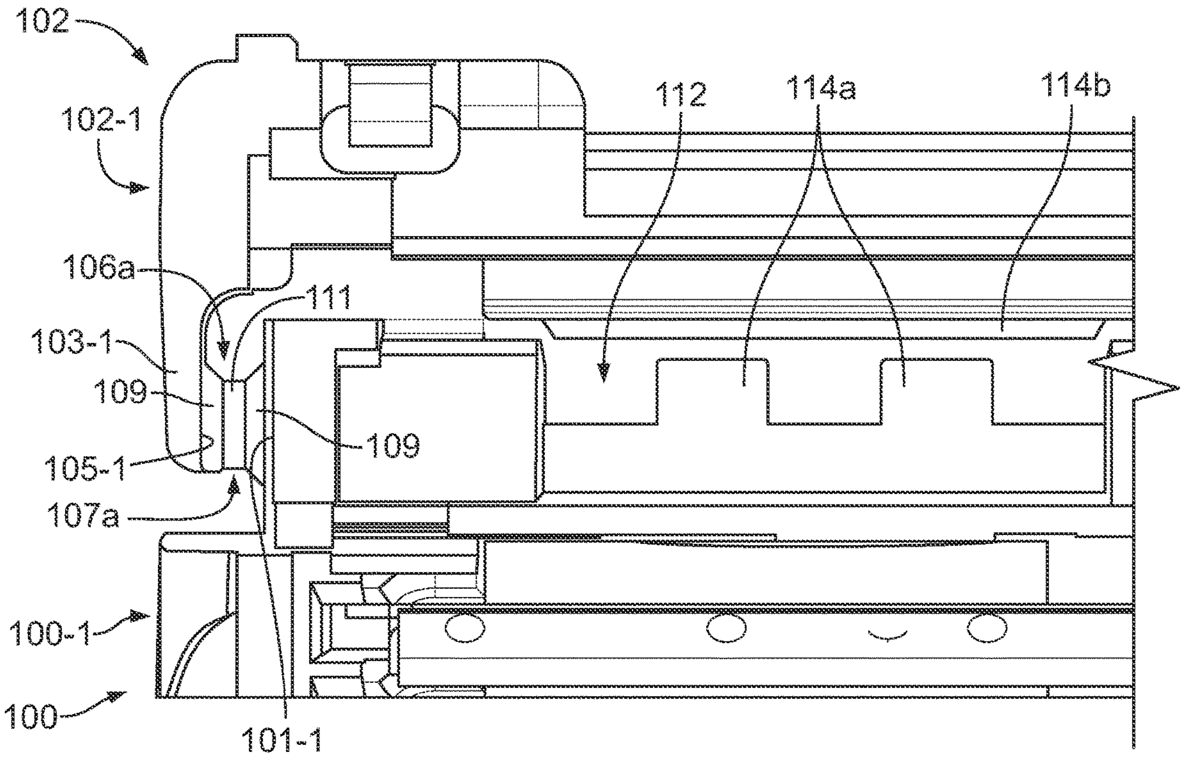
FIG. 8 is a detailed front view of the upper left corner of the razor cartridge of FIG. 5.

The second housing portion 102 may be moved from the first position to the second position by rotating the second housing portion 102 about the hinges 106*a* and 106*b*. The hinges 106*a* and 106*b* may be configured to withstand one or more cycles of rotation, e.g., movement of the second housing portion 102 from the first position to the second position. With reference to FIG. 8, a detailed front view of the first hinge 106*a* in the upper left portion of the razor cartridge 14 of FIG. 5 is shown, in which the second housing portion 102 is in the first position and the one or more shaving razor components 50, 130 have not yet been installed. A first lateral end 102-1 of the second housing portion 102 comprises a first arm 103-1, and a first lateral end 100-1 of the first housing portion 100 comprises a first post 107*a* that defines the first hinge 106*a*. The first post 107*a* extends outward from the first lateral end 100-1 of the first housing portion 100 and is connected to (i.e., integral with) the first arm 103-1 (see also FIG. 6). For example, as shown in FIG. 8, the first post 107*a* is formed on, and extends outward from, an outer surface 101-1 of the first lateral end 100-1 of the first housing portion 100 and is connected to an inner surface 105-1 of the first arm 103-1.

With reference to FIG. 6, a second lateral end 102-2 of the second housing portion 102 similarly comprises a second arm 103-2, and a second lateral end 100-2 of the first housing portion 100 similarly comprises a second post 107*b* that defines the second hinge 106*b*. The second post 107*b* extends outward from the second lateral end 100-2 of the first housing portion 100 in a direction opposite that of the first post 107*a* and is connected to (i.e., integral with) the second arm 103-2. For example, the second post 107*b* is formed on, and extends outward from, an outer surface (not labeled) of the second lateral end 100-2 of the first housing portion 100 and is connected to an inner surface (not visible) of the second arm 103-2. As shown in FIGS. 6 and 8, the hinges 106*a* and 106*b*, specifically a longitudinal axis (not separately labeled) of the posts 107*a* and 107*b*, may extend along the axis 104 and may be parallel to the longitudinal axis 40 of the razor cartridge 14.

As shown in FIG. 8, the first post 107*a* comprises a "dumbbell" shape with enlarged end portions 109 that taper inward toward a narrower mid-section 111, which has a reduced cross-section as compared to the enlarged end portions 109. For example, the enlarged end portions 109 may each comprise a substantially frustoconical shape that tapers from an enlarged conical base toward a narrower apex, and the mid-section 111 may comprise a substantially cylindrical shape connecting the two apexes. As seen in FIG. 6, the second post 107*b* may comprise a substantially similar shape with enlarged end portions and a narrower mid-section (not labeled). When the second housing portion 102 is rotated about the axis 104, at least a portion of the first and second hinges 106*a* and 106*b*, i.e., the first and second posts 107*a* and 107*b*, may deform (e.g., bend, flex, twist, etc.) to allow the second housing portion 102 to move from the first position shown in FIGS. 6 and 8 to the second position shown in FIG. 1. The narrower mid-sections 111 of the first and second posts 107*a* and 107*b* may facilitate and control the deformation of the first and second posts 107*a* and 107*b* to allow for more consistent and reliable movement and accurate positioning of the second housing portion 102 during assembly.

Figure 3:
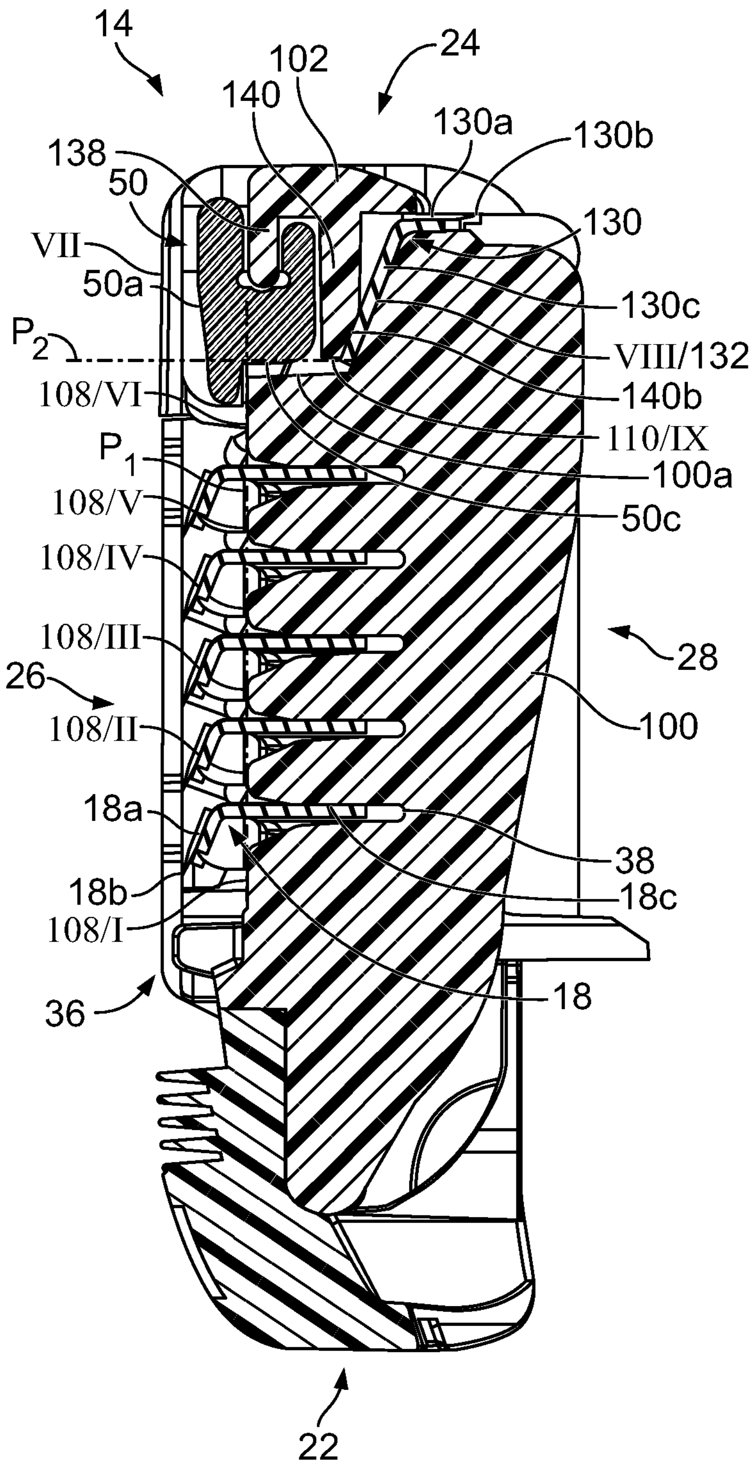
FIG. 3 is a cross-sectional view taken along line 3-3 in FIG. 1.

With reference to FIG. 3, the first housing portion 100 may comprise a first top surface 108 that is positioned on or extends along a first plane $P_1$. The first top surface 108 may be comprised of one or more topmost surfaces of all or part of the first housing portion 100. For example, the first top surface 108 may be defined by the topmost surfaces of the first housing portion 100 that face in a common direction and fall within a common plane, i.e., the first plane $P_1$. In the example shown, the first top surface 108 of the first housing portion 100 may be defined by surfaces I, II, III, IV, V, and VI, all of which fall within the first plane $P_1$ (surface VIII may be excluded from defining the first top surface 108, as surface VIII does not fall within the first plane $P_1$ and faces a different direction than surfaces I-VI). In other examples (not shown), the first top surface 108 may be defined by surface VII or by a shaving plane, i.e., a plane extending between upper surfaces of the cap 34 and the guard structure 36 of the razor cartridge 14 (see FIG. 1).

Figure 7:
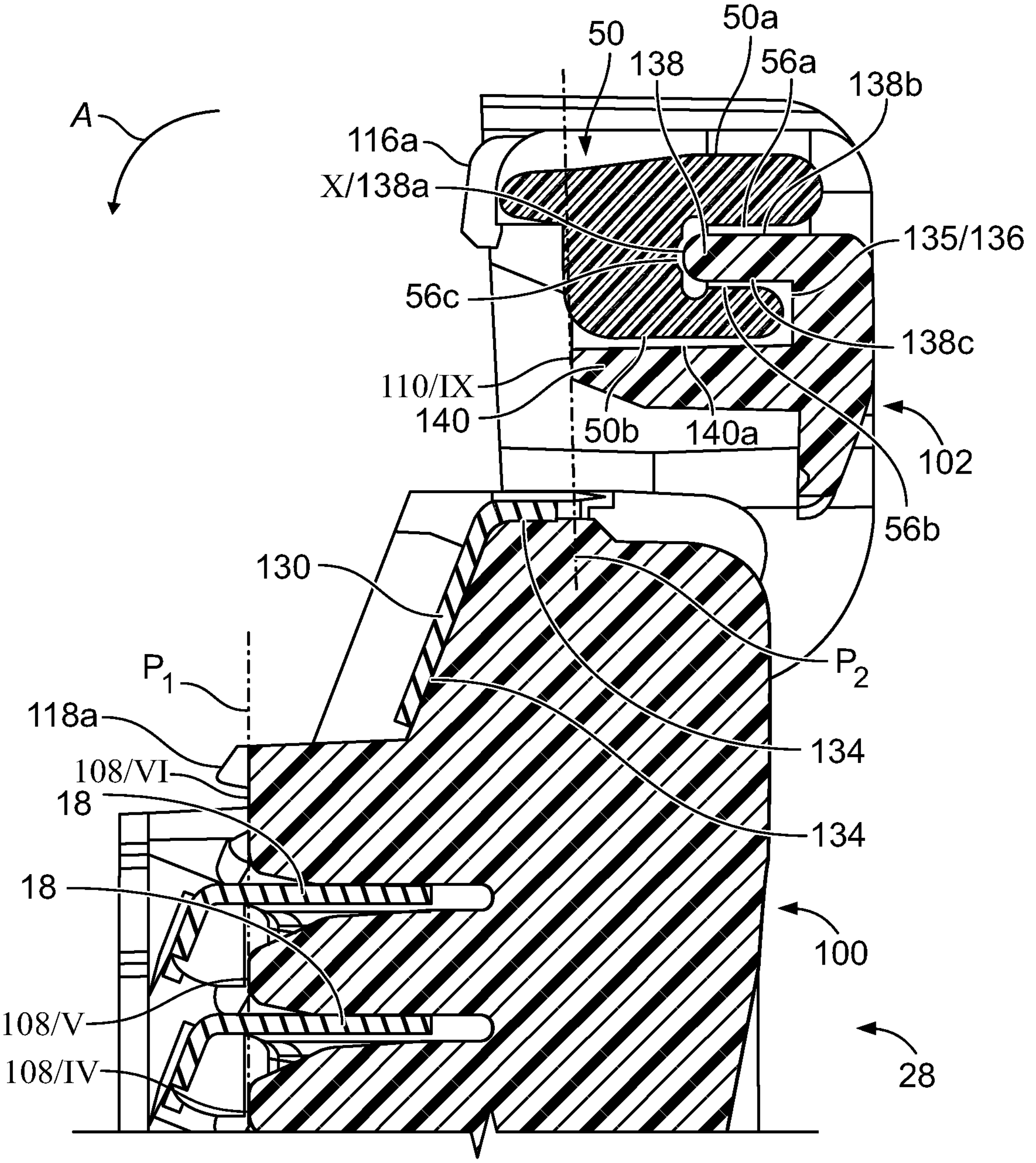
FIG. 7 is a cross-sectional view taken along line 7-7 in FIG. 6.

As shown in FIG. 7, the second housing portion 102 may comprise a second top surface 110 that is positioned on or extends along a second plane $P_2$. The second top surface 110 may similarly be comprised of one or more topmost surfaces of all or part of the second housing portion 102, e.g., the topmost surfaces of the second housing portion 102 that face in a common direction and fall within a common plane, i.e., the second plane $P_2$. In the example shown, the second top surface 110 may be defined by surface IX. In other examples (not shown), the second top surface 110 may be defined by surface X. In further examples (not shown), surfaces IX and X may fall within a single, common plane, such that both surfaces IX and X may define the second top surface 110.

With continued reference to FIG. 7, when the second housing portion 102 is in the first (open) position, the second plane $P_2$ may be positioned at an angle of between negative 30 degrees and (positive) 30 degrees (i.e., ±30 degrees) with respect to the first plane $P_1$, such that the second plane $P_2$ and the second top surface 110 of the second housing portion 102 are substantially parallel to the first plane $P_1$ and the first top surface 108 of the first housing portion 100. In the example shown in FIG. 7, the first top surface 108 is defined by surfaces I, II, III, IV, V, and VI (only surfaces IV, V, and VI are visible in FIG. 7; see FIG. 3); and the second top surface 110 is defined by surface IX; and the second plane $P_2$ is positioned at an angle of 0 degrees (i.e., parallel) with respect to the first plane $P_1$. In other examples, when the second housing portion 102 is in the first position, the second plane $P_2$ may be positioned at an angle of between ±15 degrees, between ±10 degrees, between ±5 degrees, or between ±1 degree, with respect to the first plane $P_1$.

To move the second housing portion 102 to the second (closed) position, the second housing portion 102 is pivoted or rotated, with respect to the first housing portion 100, in the direction indicated by arrow A from the first position shown in FIG. 7 to the second position shown in FIG. 3. When the second housing portion 102 is in the second position, the second plane $P_2$ may be positioned at an angle of between 70 degrees to 130 degrees with respect to the first plane $P_1$, such that the second plane $P_2$ and the second top surface 110 of the second housing portion 102 are substantially transverse to the first plane $P_1$ and the first top surface 108 of the first housing portion 100. In the example shown in FIGS. 1, 3, and 6, the second plane $P_2$ intersects the first plane $P_1$ at a 90 degree angle. In other examples, when the second housing portion 102 is in the second position, the second plane $P_2$ may be positioned at an angle of between, for example, 60 degrees to 120 degrees, 70 degrees to 110 degrees, 80 degrees to 110 degrees, 80 degrees to 100 degrees, or 85 degrees to 95 degrees, with respect to the first plane $P_1$.

In the examples shown in FIGS. 1, 3, and 6 in which the second plane $P_2$ intersects the first plane $P_1$ at a 90 degree angle, the second housing portion 102, when moving from the first position to the second position, pivots or rotates about the axis 104 by 90 degrees. In other examples, the second housing portion 102, when moving from the first position to the second position, may pivot or rotate about the axis 104 by between 40 degrees to 160 degrees (as determined by the relative angular orientation of the first and second planes $P_1$ and $P_2$ when the second housing portion 102 is in the first position versus the second position). In some particular examples, the second housing portion 102, when moving from the first position to the second position, may pivot or rotate about the axis 104 by between 60 degrees to 120 degrees, between 70 degrees to 110 degrees, between 80 to 100 degrees, or between 85 degrees to 95 degrees.

As shown in FIGS. 5 and 8, the second housing portion 102 is spaced apart from the first housing portion 100 to define an elongated gap 112 extending in a longitudinal direction that is parallel to the cutting edges (as defined by the blade tips 18*b*) of the blades 18*a*, e.g., parallel to the longitudinal axis 40 of the razor cartridge 14. The elongated gap 112 may be between 0.1 mm and 2.0 mm wide (in a front to back direction) and between 40 mm to 2.0 mm long (in a direction parallel to the cutting edges of the blades 18*a* and the longitudinal axis 40 of the razor cartridge 14). The elongated gap 112 may help to facilitate rotation of the second housing portion 102 to the second position.

Figure 2:
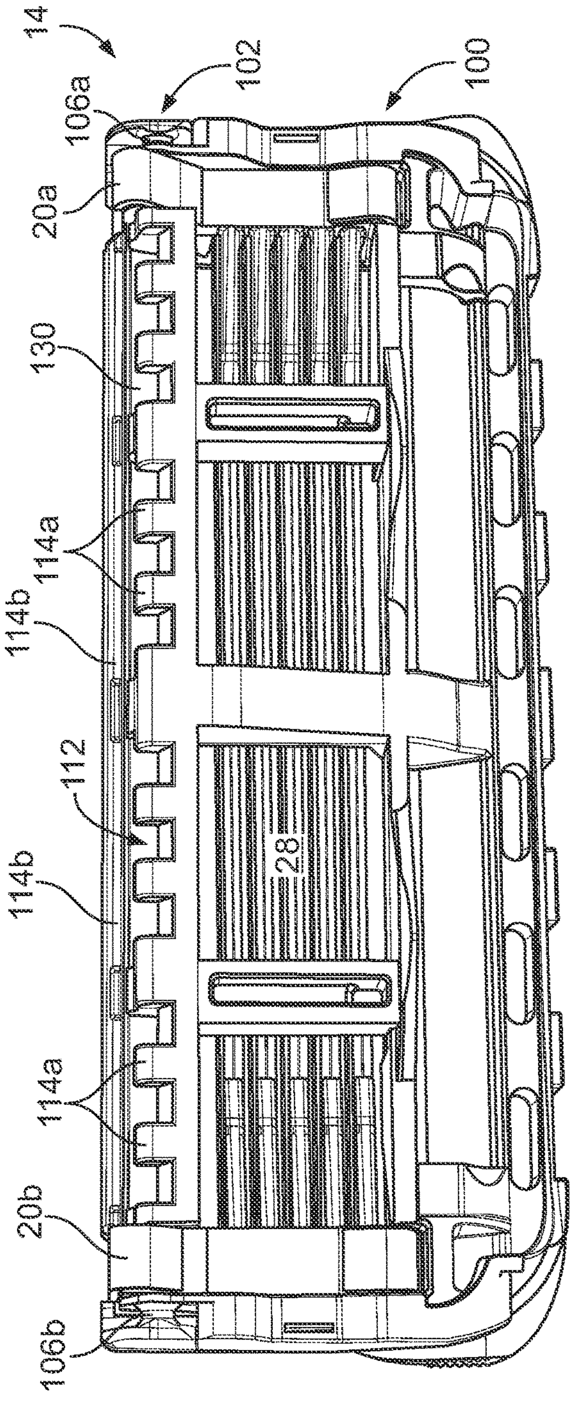
FIG. 2 is a back, perspective view of the razor cartridge of FIG. 1.

The elongated gap 112 may be at least partially defined by a series of castellations 114*a* and 114*b* formed on one or both of the first housing portion 100 and the second housing portion 102. For example, with reference to FIG. 8 in which the second housing portion 102 is in the first position, the first housing portion 100 includes castellations 114*a* extending outward toward the second housing portion 102 (i.e., toward the back portion 24 of the razor cartridge 14; see FIG. 3). The second housing portion 102 includes castellations 114*b* extending outward toward the first housing portion 100 (i.e., toward the front portion 22 of the razor cartridge 14; see FIG. 3). As shown in FIG. 2, after the second housing portion 102 is moved to the second position, the castellations 114*b* formed on the second housing portion 102 extend in a direction that is transverse to the castellations 114*a* formed on the first housing portion 100 (i.e., the castellations 114*b* now extend toward the bottom portion 28 of the razor cartridge 14). The castellations 114*a* and 114*b* may allow for manufacturing of a smaller elongated gap 112, while still maintaining the necessary clearance for rotation of the second housing portion 102.

Figure 4:
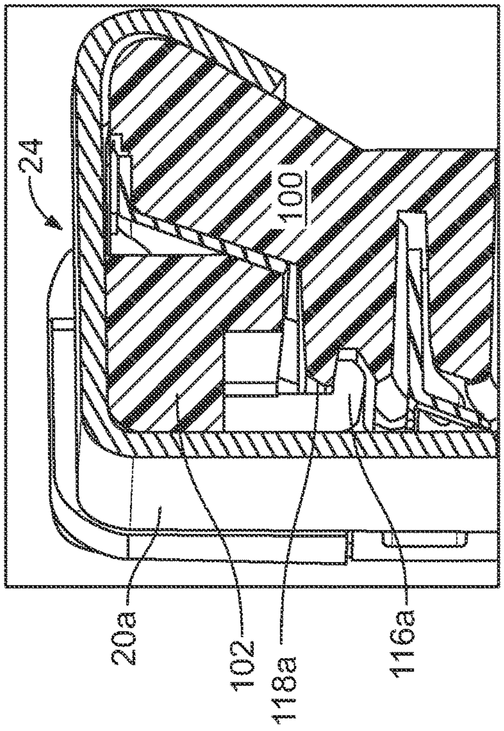
FIG. 4 is a cross-sectional view taken along line 4-4 in FIG. 1.

The second housing portion 102 may be held in the second position via one or more engagement mechanisms. For example, the first and second housing portions 100 and 102 may be held together by engaging them with a snap fit. With reference to FIGS. 4 and 6, the second housing portion 102 may comprise one or more hooks 116*a* and 116*b*, and the first housing portion 100 may comprise one or more corresponding protrusions 118*a* and 118*b* formed on and extending outward from the first top surface 108 (e.g., from surface VI, see FIG. 7). When the second housing portion 102 is moved to the second position, i.e., by rotating the second housing portion 102 about the axis 104 in the direction of arrow A, the one or more hooks 116*a* and 116*b* engage the one or more corresponding protrusions 118*a* and 118*b* via a snap fit, as shown in FIG. 4, to hold the second housing portion 102 in the second position.

Engagement between the first and second housing portions 100 and 102 with a snap fit may permanently or temporarily hold the second housing portion in the second position. Alternatively, or in addition to engagement between the hook(s) 116*a* and 116*b* and protrusion(s) 118*a* and 118*b*, the first and second clips 20*a* and 20*b* may hold the second housing portion 102 in the second position. As shown in FIG. 4, when the second housing portion 102 is in the second position, the first clip 20*a* extends over the back portion 24 of the razor cartridge 14. In particular, the first clip 20*a* extends over the second housing portion 102. An end (not labeled) of the first clip 20*a* may curve to engage the bottom portion 28 of the razor cartridge 14 to permanently secure the second housing portion 102 in the second position and to prevent removal of the first clip 20*a*, as known in the art. In examples in which the second housing portion 102 includes the hook 116*a*, the first clip 20*a* may extend over the hook 116*a*, such that the hook 116*a* is fully or partially obscured from view, as seen in FIGS. 1 and 4. As shown in FIG. 1, the second clip 20*b* may be substantially similar to the first clip 20*a* and may extend over the back portion 24 of the razor cartridge 14, specifically the second housing portion 102, and may fully or partially obscure the hook 116*b* from view.

The razor cartridge 14 in accordance with the present disclosure may be configured to receive one or more shaving razor components that are secured between the first and second housing portions 100 and 102. The shaving razor component may comprise one or more of a skin engaging member 50, as described herein, which may include a lubricating member, a skin stretching member, an exfoliating bar, etc.; a blade member or assembly such as a trimmer blade member 130 as described here; a heating member; a cooling member; a sensor; or any combination thereof.

Figure 9:
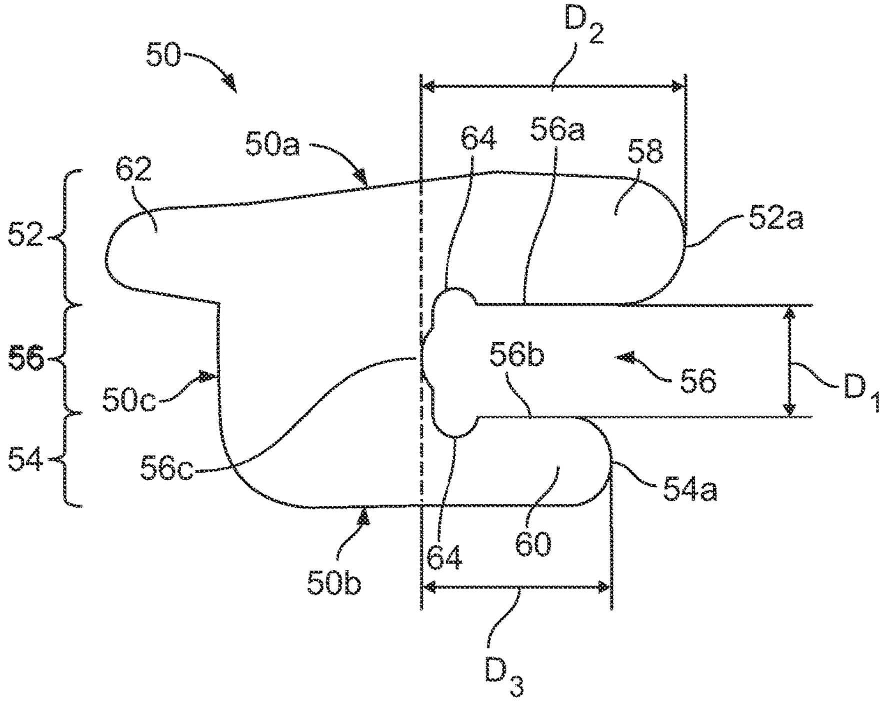
FIG. 9 is an end view of a skin engaging member in accordance with an aspect of the present disclosure.

With reference to FIG. 9, the skin engaging member 50 may comprise a body having an upper portion 52, a lower portion 54, and a connecting portion 55 that connects the upper and lower portions 52 and 54. The lower portion 54 of the skin engaging member 50 may be spaced apart from the upper portion 52 to define an elongated channel 56 therebetween. For example, the upper portion 52 may comprise a first lobe 58, and the lower portion 54 may comprise a second lobe 60, in which the first and second lobes 58 and 60 extend in a same, first direction and are spaced apart from each other to define the elongated channel 56 therebetween. The elongated channel 56 may extend longitudinally along substantially an entire length of the skin engaging member 50 (see also FIG. 5) and is configured to receive a portion of the second housing portion 102, as described herein. In the example shown in FIG. 9, the upper portion 52 of the skin engaging member 50 may further comprise a third lobe 62 that extends in a second direction that is opposite the direction in which the first and second lobes 58 and 60 extend, such that a cross-sectional shape of the skin engaging member 50 is generally in the form of a capital "J."

The skin engaging member 50 comprises an upper surface 50*a*, a lower surface 50*b*, and a front surface 50*c*, in which the upper surface 50*a* may define a skin contacting or skin engaging surface of the skin engaging member 50. The upper and lower portions 52 and 54 of the skin engaging member 50 comprise respective front walls 52*a* and 54*a* that may be parallel to each other and transverse to the skin engaging surface (i.e., the upper surface 50*a*) of the skin engaging member 50. A top channel wall 56*a*, a bottom channel wall 56*b*, and a rear channel wall 56*c* define the elongated channel 56. A distance $D_1$ between the top and bottom channel walls 56*a* and 56*b* may be between 0.25 mm and 1.5 mm. In some examples, the distance $D_1$ may be 0.5 mm, ±0.25 mm A distance $D_2$ from the rear channel wall 56*c* to the front wall 52*a* of the upper portion 52 may be between 0.25 mm and 2.0 mm. In some examples, the distance $D_2$ may be 1.2 mm, ±0.5 mm A distance $D_3$ from the rear channel wall 56*c* to the front wall 54*a* of the lower portion 54 may be between 0.25 mm and 2.0 mm. In some examples, the distance $D_3$ may be 0.85 mm, ±0.5 mm. In some instances, $D_2$ may be greater than $D_3$, as shown in FIG. 9, to allow for a skin engaging surface with a larger surface area and/or greater deposition of desirable materials on the skin contacting surface, as described herein. The third lobe 62, when present, may also provide a skin engaging surface with a larger surface area. In other instances, $D_2$ may be the same as, or less than, than $D_3$.

The rear channel wall 56*c* may be curved, as shown in FIG. 9, or may be substantially planar. The rear channel wall 56*c* may be transverse with respect to the top and bottom channel walls 56*a* and 56*b* and the skin engaging surface (i.e., the upper surface 50*a*) of the skin engaging member 50. The rear channel wall 56*c* may be parallel to the front walls 52*a* and 54*a* of the upper and lower portions 52 and 54 of the skin engaging member 50. The top and bottom channel walls 56*a* and 56*b* may be substantially planar and may be parallel to one another and to the skin engaging surface (i.e., the upper surface 50*a*) of the skin engaging member 50. In some examples, the elongated channel 56 may comprise one or more relief surfaces 64 that extend into the skin engaging member 50, e.g., extending inward from the top, bottom, and/or rear channel walls 56*a*-56*c* toward the upper, lower, and/or front surfaces 50*a*-50*c* of the skin engaging member 50. The relief surface 64 may comprise any desirable shape or combination of shapes. For example, as shown in FIG. 9, the top channel wall 56*a* and the bottom channel wall 56*b* may each comprise a relief surface 64, and the relief surfaces 64 each comprise a semicircular cutout. The relief surface(s) 64 may, for example, help to offset dimensional changes during and/or after processing of the skin engaging member 50.

The skin engaging member 50 is configured to be received between the first and second housing portions 100 and 102. With reference to FIGS. 5 and 7, the second top surface 110 of the second housing portion 102 comprises an engagement surface 135 formed therein that is configured to receive a shaving razor component such as the skin engaging member 50. In the example shown, the engagement surface 135 comprises a slot 136 that is defined between a first rail 138 and a second rail 140. The first and second rails 138 and 140 extend longitudinally between the first and second lateral ends 102-1 and 102-2 of the second housing portion 102. When the skin engaging member 50 is inserted into the razor cartridge 14 and positioned against the engagement surface 135, a portion of the second housing portion 102, specifically the first rail 138, is received in the elongated channel 56 of the skin engaging member 50, as shown in FIG. 7. The first rail 138 may comprise a front rail wall 138*a*, a top rail wall 138*b*, and a bottom rail wall 138*c*, in which the top and bottom rail walls 138*b* and 138*c* may be parallel to one another and transverse to the front rail wall 138*a*. When the skin engaging member 50 is received in the slot 136, the front rail wall 138*a* may be adjacent to the rear channel wall 56*c* of the skin engaging member 50, the top rail wall 138*b* may be adjacent to the top channel wall 56*a* of the skin engaging member 50, and the bottom rail wall 138*c* may be adjacent to the bottom channel wall 56*b* of the skin engaging member 50. The lower surface 50*b* of the skin engaging member 50 may be adjacent to a top wall 140*a* of the second rail 140.

A profile of the front rail wall 138*a* may comprise any desired shape and may substantially correspond to a shape of the rear channel wall 56*c* of the skin engaging member 50. For example, as shown in FIG. 7, the front rail wall 138*a* comprises a rounded convex shape, and the rear channel wall 56*c* comprises a corresponding, rounded concave shape. In some examples, the portion of the skin engaging member 50 that is received in the slot 136 may be slightly larger than the slot 136, such that one or more of the top, bottom, and rear channel walls 56*a*, 56*b*, and 56*c* and the lower surface 50*b* of the skin engaging member 50 contact and engage the first and/or second rails 138 and 140 via a friction fit. In other examples (not shown), the front rail wall 138*a* may form a point and may puncture the rear channel wall 56*c* to help with retention of the skin engaging member 50 in the razor cartridge 14.

As shown in FIG. 3, alternatively or in addition to the skin engaging member 50, the razor cartridge 14 may comprise a shaving razor component in the form of the trimmer blade member 130, which is disposed between the first and second housing portions 100 and 102. The trimmer blade member 130 may comprise a substantially identical structure to the razor blade member(s) 18 that are mounted in the first housing portion 100. In the example shown, the trimmer blade member 130 may include an assembly that comprises a blade 130*a* and a blade support member 130*c* coupled to the blade 130*a*. A blade tip 130*b* defines a cutting edge of the blade 130*a*.

The first housing portion 100 comprises a support surface 132 defined therein that is configured to receive the trimmer blade member 130, as shown in FIG. 5. The support surface 132 may be at least partially defined by one or more discrete or discontinuous support members 134, as shown in FIG. 5 (see also FIG. 7). In other examples (not shown), the support surface 132 may be continuous. The support surface 132 may further comprise projections 132*a* formed in the first housing portion 100, which engage shoulders 130*d* formed in the blade support member 130*c* to help properly position the trimmer blade member 130 and hold the trimmer blade member 130 in place.

With the second housing portion 102 in the first (open) position as shown in FIGS. 5-7, the shaving razor component(s) 50, 130 may be positioned within the razor cartridge 14. For example, the skin engaging member 50 may be positioned against the engagement surface 135, and/or the trimmer blade member 130 may be positioned against the support surface 132. Following positioning of the skin engaging member 50 against the engagement surface 135, the upper surface 50*a* of the skin engaging member 50 (i.e., the skin engaging surface) may be generally transverse with respect to the first and second planes $P_1$ and $P_2$ (e.g., positioned at an angle of between 70 degrees and 130 degrees).

After the shaving razor component(s) 50, 130 are positioned within the razor cartridge 14, the second housing portion 102 may be moved to the second (closed) position as shown in FIG. 3. When the second housing portion 102 is in the second position, the skin engaging member 50 and the trimmer blade member 130 are secured between the first and second housing portions 100 and 102. The upper surface 50*a* of the skin engaging member 50 (i.e., the skin engaging surface) may be generally parallel (e.g., ±15 degrees) to the first plane $P_1$ and to the first top surface 108 of the first housing portion 100. Because the position of the skin engaging member 50 is fixed relative to the second housing portion 102, the upper surface 50$a$ of the skin engaging member 50 remains generally transverse to the second plane $P_2$. For example, when the second housing portion 102 is in the second position as shown in FIG. 3, the upper surface 50$a$ of the skin engaging member 50 may be positioned at an angle of about 90 degrees (±15 degrees), as compared to the upper surface 50$a$ when the second housing portion 102 is in the first position (see FIG. 7).

As described above, the skin engaging member 50 is adjacent to, and may engage, the first and second rails 138 and 140, and as shown in FIG. 3, the front surface 50$c$ of the skin engaging member 50 is adjacent to, and may engage, an adjacent surface 100$a$ of the first housing portion 100. When the second housing portion 102 is in the second position, the rails 138 and 140 create an undercut structure that holds the skin engaging member 50 securely between the first and second housing portions 100 and 102, such that it is more difficult to remove the skin engaging member 50 from the razor cartridge 14. In some particular instances, the skin engaging member 50 may comprise a lubricating material, which may undergo dimensional changes upon contact with water, and the undercut structure helps to ensure that the skin engaging member 50 remains in position.

As described herein, the upper surface 50$a$ of the skin engaging member 50 may define a skin engaging surface, and in some examples, the skin engaging member 50 may comprise a skin contacting element that helps, for example, to define a shaving plane and control a blade exposure of the blades 18$a$. In other examples, the skin engaging member 50 may comprise a water leachable shaving aid with one or more materials having a lower coefficient of friction than a coefficient of friction of the first and second housing portions 100 and 102. The skin engaging member 50 may include one or more coatings of a lubricious material and/or may comprise one or more water soluble polymers. Typical lubricious water soluble polymers may include polyethylene oxide, polyvinyl pyrrolidone, polyacrylamide, modified hydroxyalkyl cellulose, polyvinyl imidazoline, polyvinyl alcohol, polysulfone, and polyhydroxyethylmethacrylate. The preferred lubricious water-soluble polymer is polyethylene oxide. The more preferred polyethylene oxides generally are known as POLYOX (available from Union Carbide Corporation) or ALKOX (available from Meisei Chemical Works, Kyoto, Japan). These polyethylene oxides will preferably have molecular weights of about 100,000 to 8 million Daltons, most preferably about 300,000 to 5 million Daltons. It is preferred to use a blend of polyethylene oxides, typically a blend having at least one polyethylene oxide having a molecular weight in the range of 100,000 to 500,000 and at least one polyethylene oxide having a molecular weight in the range of 3 million to 8 million. The most preferred polyethylene oxide comprises a blend of about 40% to 80% by weight of polyethylene oxide having an average molecular weight of about 5 million (e.g., POLYOX COAGULANT) and about 60% to 20% of polyethylene oxide having an average molecular weight of about 300,000 (e.g., POLYOX WSR-N-750). A 60:40 blend of these two polyethylene oxides million:300,000) is especially preferred.

In some particular examples, substantially an entirety of the skin engaging member 50 may comprise a lubricating material. Conventional shaving aids may comprise a composite material in which only a small portion of the body of the shaving aid, i.e., the skin engaging surface, comprises a lubricating material. The remainder of the shaving aid comprises a harder or more rigid material, such as a water insoluble polymer, that is required to hold the shaving aid in place in the razor cartridge. After multiple uses, the lubricating material of the composite shaving aid dissolves, leaving only the harder material on the skin engaging surface. The harder material and/or the depression left by the lubricating material may cause a decrease in comfort during shaving. A skin engaging member 50 in accordance with the present disclosure need not be so rigid and may include little or none of the harder material, as engagement between the elongated channel 56 of the skin engaging member 50 and the razor cartridge 14 securely retains the skin engaging member 50. Accordingly, a larger portion of the skin engaging member 50 may comprise the softer lubricating material, which may result in greater comfort during shaving and may increase the useful life of the razor cartridge 14.

With continued reference to FIG. 3, when the second housing portion 102 is in the second position, the trimmer blade member 130 is positioned against the support surface 132 defined in the first housing portion 100 such that the trimmer blade member 130 is received between the first and second housing portions 100 and 102. In particular, the trimmer blade member 130 may be sandwiched between the first housing portion 100 and the second rail 140 of the second housing portion 102, such that the second housing portion 102 secures the trimmer blade member 130 against the first housing portion 100, specifically the support surface 132. In some examples, a portion 140$b$ of the second rail 140 may be angled such that when the second housing portion 102 is in the second position, the portion 140$b$ of the second rail 140 engages the trimmer blade member 130, specifically the blade support member 130$c$, to hold the trimmer blade member 130 securely against the first housing portion 100.

Because the trimmer blade member 130 may be the same as the razor blade members 18, a (separate) specially-made trimmer assembly is no longer required to provide a trimmer blade and secure the trimmer blade to the razor cartridge. Thus, the razor cartridge 14 in accordance with the present disclosure includes fewer components, may comprise smaller overall dimensions, and facilitates faster and easier assembly, such that a cost of the razor cartridge 14 may be reduced, as compared to a razor cartridge with a conventional trimmer assembly.

The cutting edge of the blade 130$a$, as defined by the blade tip 130$b$, faces toward the bottom portion 28 of the razor cartridge 14, and the castellations 114$a$ and 114$b$ formed in the first and/or second housing portions 100 and 102 may serve as a guard and/or cap structure for the blade 130$a$. As shown in FIG. 2, when the second housing portion 102 is in the second position, the castellations 114$a$ formed on the first housing portion 100 are positioned in front of the blade 130$a$, and the castellations 114$b$ formed on the second housing portion 102 are positioned behind the blade 130$a$. The geometry, dimensions, spacing, number, etc. of the castellations 114$a$ and 114$b$ may be varied as desired to help to align hairs for trimming by the trimmer blade member 130 and/or to define a shaving plane for the blade 130$a$.

Figure 10:
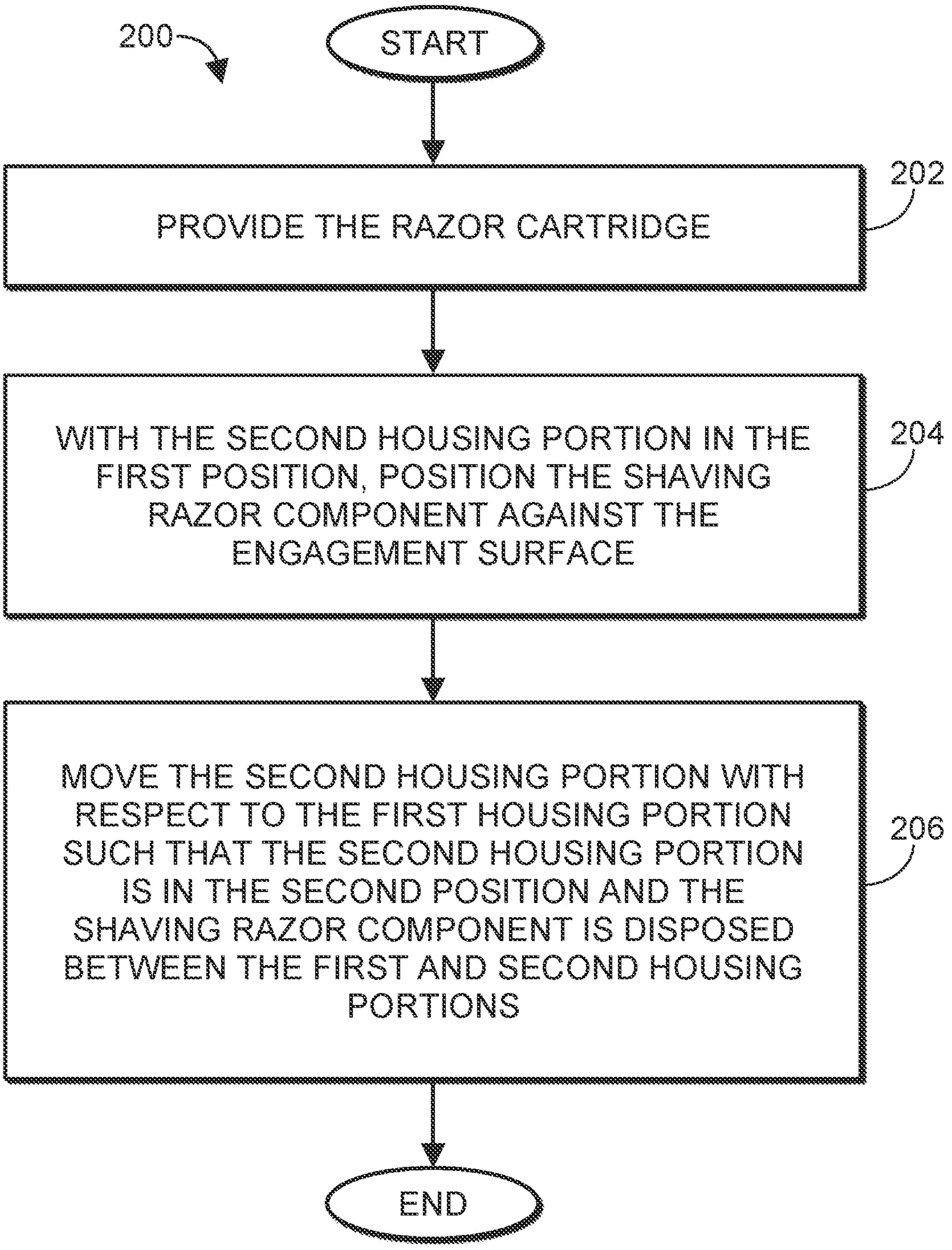
FIGS. 10-12 are flowcharts illustrating methods for retaining one or more shaving razor components in a razor cartridge in accordance with the present disclosure.
Figure 11:
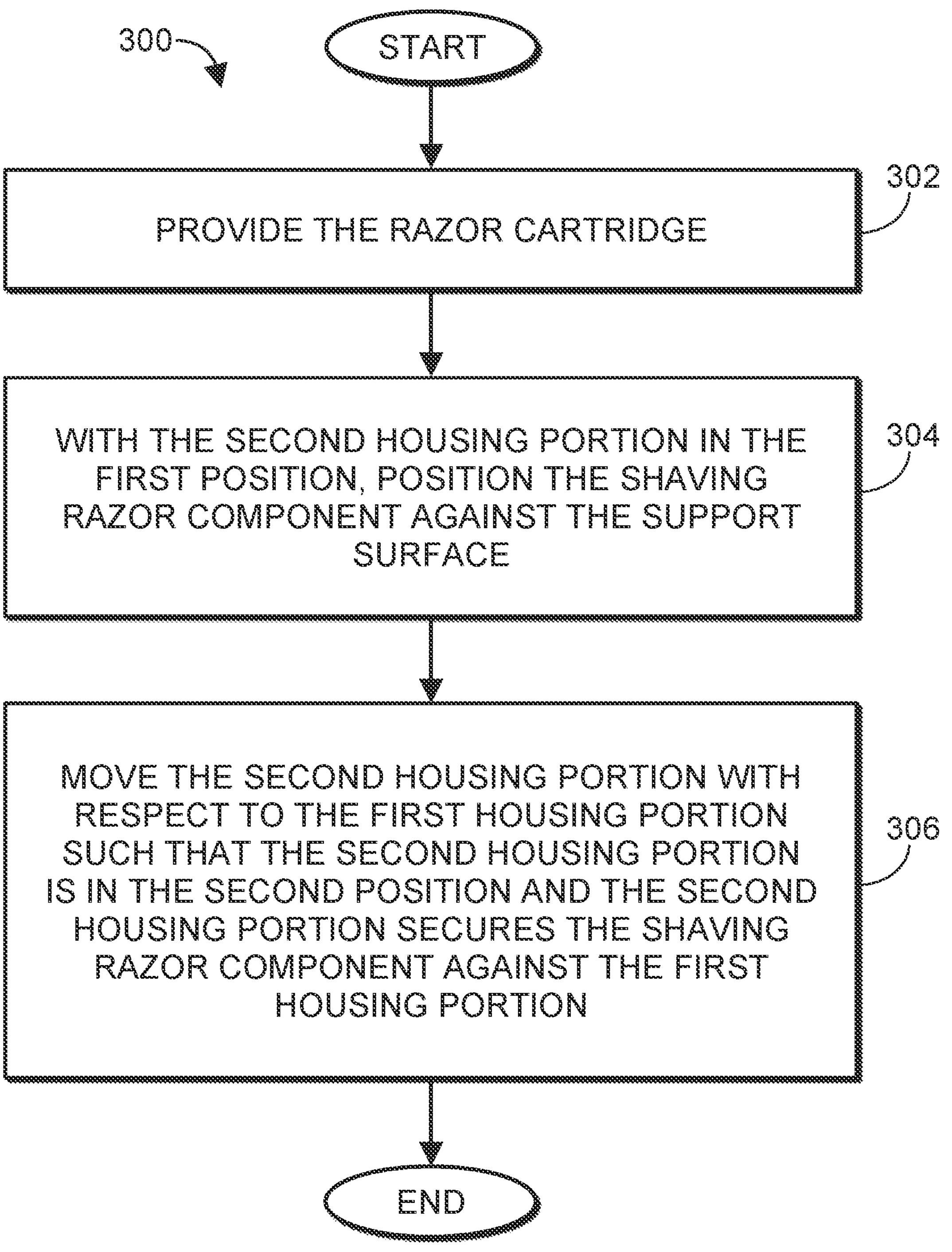
Figure 12:
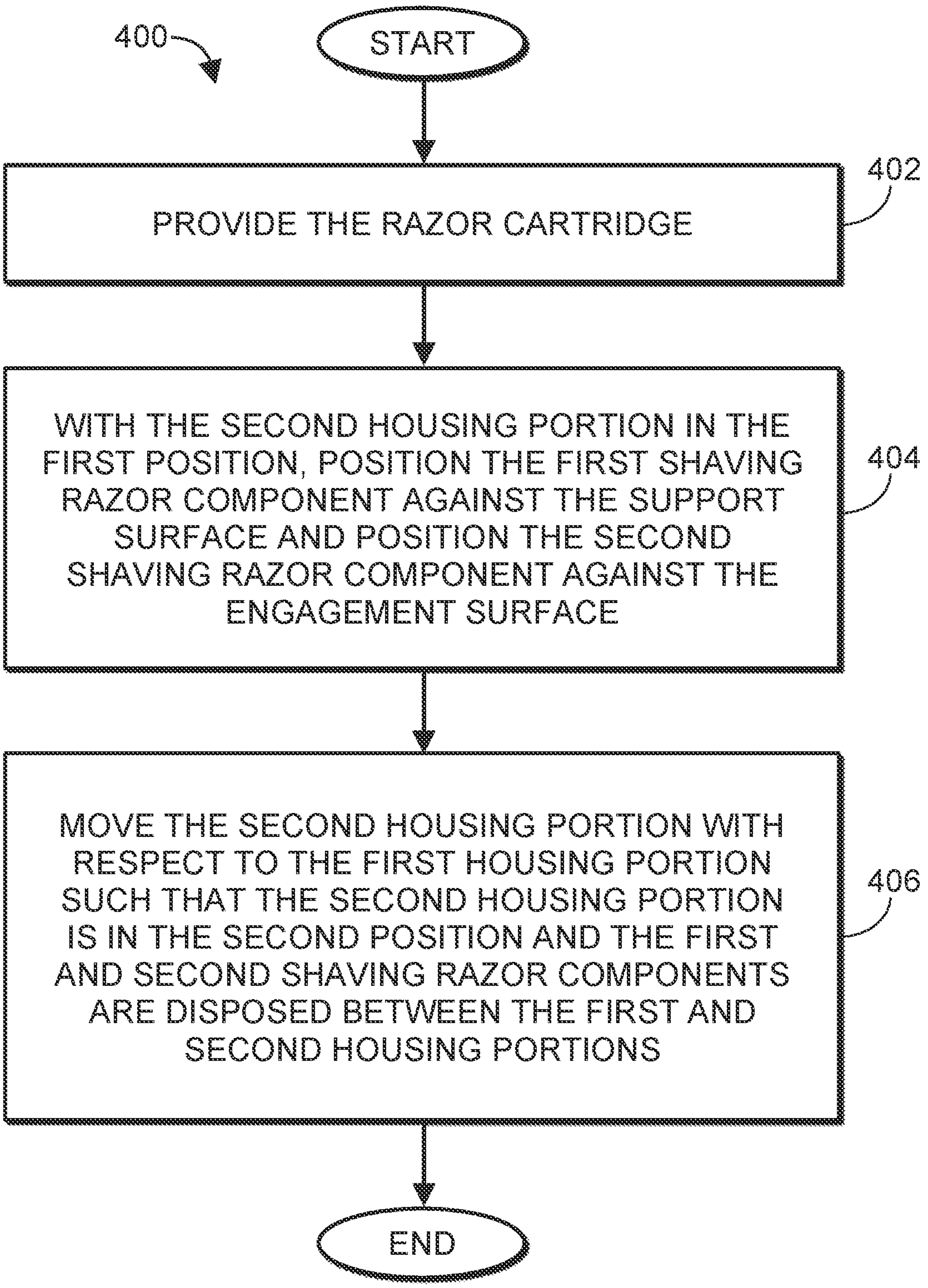

FIGS. 10-12 are flowcharts illustrating methods for retaining one or more shaving razor components in a razor cartridge in accordance with the present disclosure. With reference to FIG. 10, an exemplary method 200 for retaining a shaving razor component in a razor cartridge includes providing a razor cartridge at Step 202. As described herein, the razor cartridge includes a first housing portion having a first top surface positioned on a first plane, one or more razor blade members mounted in the first housing portion and each comprising a blade with a cutting edge, and a second housing portion rotatably attached to the first housing portion. The second housing portion includes a second top surface positioned on a second plane, in which the second top surface comprises an engagement surface configured to receive a shaving razor component. The second housing portion has a first position in which the second plane is positioned at an angle of between negative 30 degrees and 30 degrees with respect to the first plane and a second position in which the second plane is positioned at an angle of between 70 degrees to 130 degrees with respect to the first plane. With the second housing portion in the first position, the method continues at Step 204 with positioning the shaving razor component against the engagement surface. At Step 206, the second housing portion is moved with respect to the first housing portion such that the second housing portion is in the second position and the shaving razor component is disposed between the first and second housing portions, after which the method may conclude.

With reference to FIG. 11, another exemplary method 300 for retaining a shaving razor component in a razor cartridge includes providing a razor cartridge at Step 302. As described herein, the razor cartridge includes a first housing portion including a first top surface and a support surface, in which the first top surface is positioned on a first plane and the support surface is configured to receive the shaving razor component. The razor cartridge further includes a second housing portion rotatably attached to the first housing portion, in which the second housing portion includes a second top surface positioned on a second plane. The second housing portion has a first position in which the second plane is positioned at an angle of between negative 30 degrees and 30 degrees with respect to the first plane and a second position in which the second plane is positioned at an angle of between 70 degrees to 130 degrees with respect to the first plane. With the second housing portion in the first position, the method continues at Step 304 with positioning the shaving razor component against the support surface. At Step 306, the second housing portion is moved with respect to the first housing portion such that the second housing portion is in the second position and the second housing portion secures the shaving razor component against the first housing portion, after which the method may conclude.

With reference to FIG. 12, a further exemplary method 400 for retaining first and second shaving razor components in a razor cartridge includes providing a razor cartridge at Step 402. As described herein, the razor cartridge includes a first housing portion including a first top surface and a support surface, in which the first top surface is positioned on a first plane and the support surface is configured to receive a first shaving razor component. The razor cartridge further includes one or more razor blade members mounted in the first housing portion and each comprising a blade with a cutting edge, and a second housing portion rotatably attached to the first housing portion. The second housing portion includes a second top surface positioned on a second plane, in which the second top surface includes an engagement surface configured to receive a second shaving razor component. The second housing portion has a first position in which the second plane is positioned at an angle of between negative 30 degrees and 30 degrees with respect to the first plane and a second position in which the second plane is positioned at an angle of between 70 degrees to 130 degrees with respect to the first plane. With the second housing portion in the first position, the method continues with positioning the first shaving razor component against the support surface and positioning the second shaving razor component against the engagement surface at Step 404. At Step 406, the second housing portion is moved with respect to the first housing portion such that the second housing portion is in the second position and the first and second shaving razor components are disposed between the first and second housing portions, after which the method may conclude.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor cartridge comprising:

a first housing portion having one or more first surfaces define a first plane;

one or more razor blade members mounted in the first housing portion;

a second housing portion rotatably attached to the first housing portion, the second housing portion having one or more second surfaces define a second plane; and a first shaving razor component comprising a trimmer blade member disposed between the first and second housing portions, wherein the second housing portion has (i) a first position wherein the one or more surfaces that define the second plane are positioned at an angle of between negative 30 degrees and 30 degrees with respect to the first plane, and (ii) a second position wherein the one or more surfaces that define the second plane are positioned at an angle of between 70 degrees and 130 degrees with respect to the first plane, wherein when the second housing portion is in the second position, the second housing portion secures the trimmer blade member against the first housing portion, wherein the trimmer blade member comprises a blade support member and a blade coupled to the blade support member, and wherein when the second housing portion is in the second position, the blade support member is positioned against a support surface defined in the first housing portion such that the blade support member is secured between the first and second housing portions.

2. The razor cartridge of claim 1, further comprising a second shaving razor component, wherein the second housing portion comprises a slot configured to receive the second shaving razor component, the slot being defined between a first rail and a second rail that each extend longitudinally between first and second lateral ends of the second housing portion, wherein the second rail comprises at least one of the one or more surfaces positioned on the second plane, wherein when the second housing portion is in the second position:

the blade support member is sandwiched between the first housing portion and the second rail of the second housing portion; and the second shaving razor component is secured between the first and second housing portions.

* * * * *